US011329317B2

United States Patent
Petricci et al.

(10) Patent No.: US 11,329,317 B2
(45) Date of Patent: May 10, 2022

(54) LIQUID ELECTROLYTES FOR LITHIUM BATTERIES

(71) Applicant: SOLVAY SPECIALTY POLYMERS ITALY S.P.A., Bollate (IT)

(72) Inventors: Silvia Rita Petricci, Bresso (IT); Patrizia Serenella Maccone, Milan (IT); Libero Damen, Cesate (IT); Christine Hamon, Bollate (IT); Andrea Vittorio Oriani, Bresso (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 534 days.

(21) Appl. No.: 16/320,845

(22) PCT Filed: Jul. 25, 2017

(86) PCT No.: PCT/EP2017/068709
§ 371 (c)(1),
(2) Date: Jan. 25, 2019

(87) PCT Pub. No.: WO2018/019804
PCT Pub. Date: Feb. 1, 2018

(65) Prior Publication Data
US 2019/0165418 A1    May 30, 2019

(30) Foreign Application Priority Data
Jul. 25, 2016 (EP) .................... 16181016

(51) Int. Cl.
*H01M 10/0567* (2010.01)
*H01M 10/052* (2010.01)
*H01M 10/0568* (2010.01)
*H01M 10/0569* (2010.01)
*H01M 10/054* (2010.01)

(52) U.S. Cl.
CPC ..... *H01M 10/0567* (2013.01); *H01M 10/052* (2013.01); *H01M 10/0568* (2013.01); *H01M 10/0569* (2013.01); *H01M 10/054* (2013.01); H01M 2300/0034 (2013.01)

(58) Field of Classification Search
None
See application file for complete search history.

(56) References Cited

U.S. PATENT DOCUMENTS

| | | | |
|---|---|---|---|
| 5,916,708 A | 6/1999 | Besenhard et al. | |
| 6,203,944 B1 | 3/2001 | Turner et al. | |
| 7,098,173 B2 | 8/2006 | Calcut et al. | |
| 2002/0127475 A1 | 9/2002 | Marchionni et al. | |
| 2010/0047695 A1 | 2/2010 | Smart et al. | |
| 2011/0020700 A1 | 1/2011 | Iwaya | |
| 2016/0028114 A1 | 1/2016 | Pratt et al. | |
| 2016/0233549 A1* | 8/2016 | Tiruvannamalai | H01M 4/382 |

FOREIGN PATENT DOCUMENTS

| | | |
|---|---|---|
| WO | 0003444 A1 | 1/2000 |
| WO | 2014062898 A1 | 4/2014 |
| WO | 2014090649 A1 | 6/2014 |
| WO | 2014204547 A2 | 12/2014 |

OTHER PUBLICATIONS

Wong Dissertation (Year: 2015).*
Devaux, Didier et al.: "Conductivity of carbonate—and perfluoropolyether-based electrolytes in porous separators", Journal of Power Sources., May 20, 2016, pp. 158-165, vol. 323—Elsevier B.V.

* cited by examiner

*Primary Examiner* — Carmen V Lyles-Irving
(74) *Attorney, Agent, or Firm* — Osha Bergman Watanabe & Burton LLP

(57) ABSTRACT

The present invention relates to a novel liquid electrolyte to be used in lithium batteries, said electrolyte comprising a lithium salt and a (per)fluoropolyether (PFPE) polymer.

17 Claims, No Drawings

LIQUID ELECTROLYTES FOR LITHIUM BATTERIES

CROSS REFERENCE TO RELATED APPLICATIONS

This application is a U.S. national stage entry under 35 U.S.C. § 371 of International Application No. PCT/EP2017/068709 filed Jul. 25, 2017, which claims priority to European application No. 16181016.3, filed on Jul. 25, 2016. The entire contents of these applications are explicitly incorporated herein by this reference.

TECHNICAL FIELD

The present invention relates to a novel liquid electrolyte to be used in lithium batteries, said electrolyte comprising a lithium salt and a (per)fluoropolyether (PFPE) polymer.

BACKGROUND ART

Non-aqueous electrolytes for secondary cells, notably lithium batteries, typically comprise a lithium salt dissolved in a carbonate-based solvent. However, carbonate-based solvents usually have a low flash point and are easily flammable, and therefore they cause serious concerns with respect to safety of the batteries.

To overcome such a problem, combinations of solvents comprising carbonate-based solvents with one or more less flammable solvent(s) have been disclosed in the art.

For example, US 2011/0020700 (ASAHI GLASS COMPANY LIMITED) discloses a non-aqueous electrolyte for a secondary cell, which comprises a lithium salt, at least one hydro-fluoroether and at least one compound comprising a carbonate functional group in an amount of at most 10 vol. % based on the total amount of the electrolyte.

US 2010/0047695 (CALIFORNIA INSTITUTE OF TECHNOLOGY; UNIVERSITY OF SOUTHERN CALIFORNIA) discloses an electrolyte for use in a lithium-ion electrochemical cell comprising a mixture of an ethylene carbonate (EC), an ethyl methyl carbonate (EMC), a fluorinated co-solvent, a flame-retardant additive and a lithium salt. The fluorinated co-solvent is selected from fluorinated liquids having low molecular weight.

(Per)fluoropolyether polymers (PFPEs) have been disclosed in the art as additives for electrolytic compositions, for example in US 20020127475 (AUSIMONT S. P. A.).

More recently, WO 2014/062898 (THE UNIVERSITY OF NORTH CAROLINA AT CHAPEL HILL) disclosed both liquid and solid electrolyte composition for batteries. In some embodiments, the composition is a liquid electrolyte composition comprising: (a) a homogeneous solvent system comprising a perfluoropolyether (PFPE) and polyethylene oxide (PEO); and (b) an alkali metal ion salt dissolved in the solvent system. In general, the compositions are said to be made by combining PFPE, PEO, alkali metal salt and optionally a photoinitiator, in the absence of additional solvent. In Example 2, a PFPE/PEO liquid blend is said to be prepared by directly adding 10 wt. % of lithium salt to PFPE, PFPE/PEO and PEO blends and stirring at room temperature for about 12 hours. However, no data of the characterization of such blends are described in this patent application.

WO 2014/204547 (THE UNIVERSITY OF NORTH CAROLINA AT CHAPEL HILL; THE REGENTS OF THE UNIVERSITY OF CALIFORNIA) discloses liquid or solid electrolyte compositions comprising: (a) a homogeneous solvent system comprising a fluoropolymer having one or two terminal carbonate group(s) covalently coupled thereto; and (b) an alkali metal salt dissolved in said solvent system. Fluoropolymer carbonates include compounds having the following formulae (I) or (II):

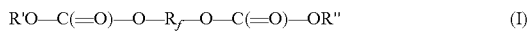
R'O—C(=O)—O—R$_f$—O—C(=O)—OR"     (I)

R'O—C(=O)—O—R$_f$     (II)

wherein R$_f$ is a fluoropolymer having a weight average molecular weight of from 0.2, 0.4 or 0.5 to 5, 10 or 20 Kg/mol and R' and R" are each independently selected from aliphatic, aromatic or mixed aliphatic and aromatic groups.

A recent literature article mentions mixtures of ethoxylated alcohol-terminated perfluoropolyether and LiTFSI as electrolytes for lithium batteries (DEVAUX, Didier, et al. Conductivity of carbonate- and perfluropolyether-based electrolytes in porous separators. *Journal of Power Sources*. May 5, 2016, vol.323, p.158-165.). However, in the conclusions, the authors stated that the conductivity of neat PFPE$_{E10H}$-based electrolyte, i.e. the ethoxylated alcohol-terminated perfluoropolyether, is of two to three orders of magnitude lower than the conductivity of a traditional electrolyte containing LiPF6 as lithium salt in a mixture of ethylene carbonate and dimethyl carbonate as the solvent.

US 20160028114 (SEEO INC.,) discloses electrode assemblies for use in electrochemical cells. According to two different embodiments, the fluorinated catholite include a mixture of perfluoropolyethers, each having
either one or two terminal urethane groups covalently coupled thereto, or
one or two terminal cyclic carbonate group covalently coupled thereto.

According to another embodiment, this document discloses an alternating copolymer based on PFPE and PEO, obtained by reacting a PFPE-diol (nucleophile) with an electrophilic PEG molecule, And having the following general formula:

—[O—(CH$_2$CH$_2$O)$_r$—(CHXCH$_2$O)$_s$—PFPE]$_t$— wherein r is from 1 to 10,000; s is from 1 to 10,000; and t is from 1 to 10,000.

However, this document does not provide any example of polymers complying with the above formula and even less of their properties when used as electrolyte in a battery.

SUMMARY OF INVENTION

The Applicant is well aware that dimethyl carbonate is a flammable liquid and hence its use as solvent in liquid electrolytes notably for lithium batteries should be avoided or at least It should be used in small concentration.

The Applicant has faced the problem of providing novel compositions to be used as liquid electrolytes for lithium batteries, free from issues such as flammability and erosion of the electrodes but showing good conductivity.

Thus, in a first aspect, the present invention relates to a liquid composition [composition C] comprising:

(a) at least one (per)fluoropolyether polymer [polymer P] comprising at least one(per)fluoropolyoxyalkylene chain [chain (R$_{pf}$)] having two chain ends, wherein at least one chain end comprises a chain [chain (R$_a$)] of formula —[CH(J)CH$_2$O]$_{na}$[CH$_2$CH(J)O]$_{na'}$—, wherein
each J is independently hydrogen, straight or branched alkyl or aryl, preferably methyl, ethyl or phenyl and na and na' are each independently zero or an integer from 1 to 50, with the proviso that na+na' is from 1 to 50;

(b) at least one lithium salt;

(c) optionally at least one solvent; and (d) optionally at least one further ingredient.

In a second aspect, the present invention relates to an assembly comprising at least one anode, at least one cathode, a separator and a liquid electrolyte comprising, preferably consisting of, composition C as defined above.

Advantageously, said assembly is for use in an electrochemical device.

Thus, in a further aspect, the present invention relates to an electrochemical device comprising the assembly as defined above.

DESCRIPTION OF EMBODIMENTS

For the purpose of the present description and of the following claims:

the use of parentheses around symbols or numbers identifying the formulae, for example in expressions like "polymer (P)", etc., has the mere purpose of better distinguishing the symbol or number from the rest of the text and, hence, said parenthesis can also be omitted;

the acronym "PFPE" stands for "(per)fluoropolyether" and, when used as substantive, is intended to mean either the singular or the plural form, depending on the context;

the term "(per)fluoropolyether" is intended to indicate fully or partially fluorinated polyether;

the term "separator" is intended to indicate a polymeric material, which electrically and physically separates electrodes of opposite polarities in an electrochemical cell and is permeable to ions flowing between them.

Preferably, said chain $(R_{pf})$ is a chain of formula —O—D—$(CFA\#)_{z1}$—O$(R_f)(CFX^*)_{z2}$—D*—O— wherein z1 and z2, equal or different from each other, are equal to or higher than 1;

X# and X*, equal or different from each other, are —F or —$CF_3$, provided that when z1 and/or z2 are higher than 1, X# and X* are —F;

D and D*, equal or different from each other, are an alkylene chain comprising from 1 to 6 and even more preferably from 1 to 3 carbon atoms, said alkyl chain being optionally substituted with at least one perfluoroalkyl group comprising from 1 to 3 carbon atoms;

$(R_f)$ comprises, preferably consists of, repeating units R°, said repeating units being independently selected from the group consisting of:

(i) —CFXO—, wherein X is F or $CF_3$;

(ii) —CFXCFXO—, wherein X, equal or different at each occurrence, is F or $CF_3$, with the proviso that at least one of X is —F;

(iii) —$CF_2CF_2CW_2O$—, wherein each of W, equal or different from each other, are F, Cl, H;

(iv) —$CF_2CF_2CF_2CF_2O$—;

(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being chosen among the following: —CFXO—, —$CF_2CFXO$—, —$CF_2CF_2O$—, —$CF_2CF_2CF_2O$—, with each of each of X being independently F or $CF_3$ and T being a $C_1$-$C_3$ perfluoroalkyl group.

Preferably, z1 and z2, equal or different from each other, are from 1 to 10, more preferably from 1 to 6 and even more preferably from 1 to 3.

Preferably, D and D*, equal or different from each other, are a chain of formula —$CH_2$—, —$CH_2CH_2$— or —CH$(CF_3)$—.

Preferably, chain $(R_f)$ complies with the following formula:

$(R_f$—I)

—[$(CFX^1O)_{g1}(CFX^2CFX^3O)_{g2}(CF_2CF_2CF_2O)_{g3}(CF_2CF_2CF_2O)_{g4}$]— wherein $X^1$ is independently selected from —F and —$CF_3$, $X^2$, $X^3$, equal or different from each other and at each occurrence, are independently —F, —$CF_3$, with the proviso that at least one of X is —F;

g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain $(R_f)$ is selected from chains of formula:

—[$(CF_2CF_2O)_{a1}(CF_2O)_{a2}$]—      ($R_f$-IIA)

wherein:

a1 and a2 are independently integers ≥0 such that the number average molecular weight is between 400 and 10,000, preferably between 400 and 5,000; both a1 and a2 are preferably different from zero, with the ratio a1/a2 being preferably comprised between 0.1 and 10;

—[$(CF_2CF_2O)_{b1}(CF_2O)_{b2}(CF(CF_3)O)_{b3}(CF_2CF(CF_3)O)_{b4}$]—      ($R_f$-IIB)

wherein:

131, b2, b3, b4, are independently integers ≥0 such that the number average molecular weight is between 400 and 10,000, preferably between 400 and 5,000; preferably b1 is 0, b2, b3, b4 are >0, with the ratio b4/(b2+b3) being 1;

—[$(CF_2CF_2O)_{c1}(CF_2O)_{c2}(CF_2(CF_2)_{cw}CF_2O)_{c3}$]—      ($R_f$-IIC)

wherein:

cw=1 or 2;

c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

—[$(CF_2CF(CF_3)O)_d$]—      ($R_f$-IID)

wherein:

d is an integer >0 such that the number average molecular weight is between 400 and 10,000, preferably between 400 and 5,000;

—[$(CF_2CF_2C(Hal^*)_2O)_{e1}$—$(CF_2CF_2CH_2O)_{e2}$—$(CF_2CF_2CH(Hal^*)O)_{e3}$]—      ($R_f$-IIE)

wherein:

Hal*, equal or different at each occurrence, is a halogen selected from fluorine and chlorine atoms, preferably a fluorine atom;

e1, e2, and e3, equal to or different from each other, are independently integers ≥0 such that the (e1+e2+e3) sum is comprised between 2 and 300.

Still more preferably, chain (R$_f$) complies with formula (R$_f$-III) here below:

—[(CF$_2$CF$_2$O)$_{a1}$(CF$_2$O)$_{a2}$]— (R$_f$-III)

wherein:

a1, and a2 are integers >0 such that the number average molecular weight is between 400 and 10,000, preferably between 400 and 5,000, with the ratio a1/a2 being generally comprised between 0.1 and 10, more preferably between 0.2 and 5.

Preferably, in said chain (R$_a$), na+na' is from 1 to 45, more preferably from 4 to 45, even more preferably from 4 to 30. Preferred embodiments are those wherein na+na' is from 4 to 15.

More preferably, said chain (R$_a$) is selected from:

—(CH$_2$CH$_2$O)$_{j1}$—H (Ra-I)

—[CH$_2$CH(CH$_3$)O]$_{j2}$—H (Ra-II)

—[(CH$_2$CH$_2$O)$_{j3}$—(CH$_2$CH(CH$_3$)O)$_{j4}$]$_{(x)}$—H (Ra-III)

wherein j1 and j2, each independently, are an integer from 1 to 50, preferably from 2 to 50, more preferably from 3 to 40, even more preferably from 4 to 15, and still more preferably from 4 to 10;

j3, j4 and j(x) are integers from 1 to 25, such that the sum of j3 and j4 is from 2 to 50, more preferably from 3 to 40, even more preferably from 4 to 15, and still more preferably from 4 to 10.

The recurring units having j3 and j4 as indexes can be either randomly distributed or they can be arranged to form blocks.

Polymers P are commercially available from Solvay Specialty Polymers (Italy) and can be obtained according to the method disclosed in WO 2014/090649 (SOLVAY SPECIALTY POLYMERS ITALY S.P.A.).

Preferably, said at least one polymer P is in an amount of from 5 to 90 wt. %, more preferably from 10 to 85 wt. %, based on the total weight of composition C.

Preferably, said lithium salt is selected in the group comprising LiPF$_6$, LiBF$_4$, LiClO$_4$, lithium bis(oxalato)borate ("LiBOB"), LiN(CF$_3$SO$_2$)$_2$ (LiTFSI), LiN(C$_2$F$_5$SO$_2$)$_2$, M[N(CF$_3$SO$_2$)(R$_F$SO$_2$)]$_n$ with R$_F$ being C$_2$F$_5$, C$_4$F$_9$, CF$_3$OCF$_2$CF$_2$, LiAsF$_6$, LiC(CF$_3$SO$_2$)$_3$, 4,5-dicyano-2-(trifluoromethyl) imidazole (LiTDI), and combinations or mixtures thereof.

Preferably, composition C comprises said at least one lithium salt in a concentration higher than 0.5 moles/liter, more preferably from 0.5 to 2 moles/liter.

When present, said at least one solvent is a non-aqueous solvent.

Preferably, said non-aqueous solvent is selected in the group comprising optionally fluorinated aliphatic and cyclic carbonates, aliphatic and cyclic ethers, glymes, ionic liquids, and mixtures thereof. Aliphatic and cyclic carbonates being more preferred.

More preferably, said aliphatic carbonate is selected in the group comprising, preferably consisting of, dimethyl carbonate, ethyl carbonate, diethyl carbonate, methylethyl carbonate, di-n-propyl carbonate, methyl-n-propyl carbonate, ethyl-n-propyl carbonate, methylisopropryl carbonate, ethyl-n-propyl carbonate, ethylisopropyl carbonate, diisopropyl carbonate, 3-fluoropropylmethyl carbonate and mixtures thereof. Ethyl carbonate, dimethyl carbonate, diethyl carbonate and methylethyl carbonate being more preferred.

Embodiments wherein dimethyl carbonate (DMC) is used as solvent in the liquid composition according to the present invention are also encompasses by the present invention, despite however it is preferably replaced with different solvents so as to avoid issues of flammability.

More preferably, said cyclic carbonate is selected in the group comprising, preferably consisting of, propylene carbonate, ethylene carbonate (EC), fluoroethylene carbonate, butylene carbonate, 4-chloro-1,3-dioxolan-2-one, 4-fluoro-1,3-dioxolan-2-one, 4-trifluoromethyl-1,3-dioxolan-2-one, dimethylvinylene carbonate, vinylene carbonate and mixtures thereof. Ethylene carbonate and fluoroethylene carbonate being more preferred.

More preferably, said at least one solvent is selected from ethylene carbonate (EC), dimethyl carbonate (DMC) and mixtures thereof.

Preferably, said at least one solvent is in an amount of from 1 to 80 wt. %, more preferably from 5 to 70 wt. % and even more preferably from 10 to 70 wt. %, based on the total weight of said composition C.

Further suitable ingredients can be added to said composition (C). The amounts of said further ingredients can be adjusted on a case by case basis by the person skilled in the art of electrochemical devices.

Suitable further ingredients (also referred to as additives) are selected in the group comprising: solvents, vapour-pressure suppressing agents, overcharge-preventing agents, dehydrating agents, deoxidizing agents, solid electrolyte interface (SEI) forming agents, and the like.

Preferably, each of said further ingredients is used in an amount of from 0.01 to 5 wt. % based on the total weight of composition C.

Preferably, suitable solvents are selected from the group comprising carboxylic acid esters, such as alkyl propionate, dialkyl malonate and alkyl acetate; cyclic ester, such as gamma-butyrolactone; cyclic sulfonate such as propanesulfone; alkyl sulfonate; alkyl phosphate; and mixtures thereof.

Preferably, suitable vapour-pressure suppressing agents are selected from the group comprising fluorinated alkane having from 4 to 12 carbon atoms, such as for example n-C$_4$H$_9$CH$_2$CH$_3$, n-C$_6$F$_{13}$CH$_2$CH$_3$, n-C$_6$F$_{13}$H, n-C$_8$, F$_{17}$H and mixtures thereof.

Preferably, said overcharge-preventing agents are selected in the group comprising biphenyl, alkylbiphenyl, terphenyl, partially hydrogenated terphenyl, cyclohexyl benzene, t-butylbenzene, t-amylbenzene, diphenyl ether, dibenzofuran, 2-fluorobiphenyl, o-cyclohexylfluorobenzene, p-cyclohexylfluorobenze, 2,4-difluoroanisole, 2,5-difluoroanisole, 2,6-difluoroanisole, and mixtures thereof.

Preferably, said dehydrating agents are selected in the group comprising magnesium sulphate, calcium hydrate, sodium hydrate, potassium hydrate, lithium aluminium hydrate and mixtures thereof.

Preferably, said composition C is prepared by mixing together said polymer P and said at least one lithium salt.

At least one solvent as those described above can be also added to the mixture comprising at least one polymer P and at least one lithium salt.

Typically, first the lithium salt is dissolved into the at least one solvent as defined above and then polymer P is added to the mixture.

At least one further ingredient as those described above can be also added to the mixture comprising at least one polymer P, at least one lithium salt and at least one solvent.

Suitable active materials for the anode (negative electrode) are selected from the group consisting of:

graphitic carbons able to intercalate lithium, typically existing in forms such as powders, flakes, fibers or spheres (for example mesocarbon microbeads) hosting lithium;

lithium metal;

lithium alloy composition, including notably those described in U.S. Pat. No. 6,203,944 (3M INNOVATIVE PROPERTIES) and/or in WO 00/03444 (MINNESOTA MINING);

lithium titanates, generally represented by formula $Li_4Ti_5O_{12}$; these compounds are generally considered as "zero-strain" insertion materials, having low level of physical expansion upon taking up the mobile ions, i.e. $Li^+$;

lithium-silicon alloys, generally known as lithium silicides with high Li/Si ratios, in particular lithium silicides of formula $Li_{4.4}Si$;

lithium-germanium alloys, including crystalline phases of formula $Li_{4.4}Ge$.

The anode may contain additives as will be familiar to those skilled in the art. Among them, mention can be made notably of carbon black, graphene or carbon nanotubes. As will be appreciated by those skilled in the art, the negative electrode may be in any convenient form including foils, plates, rods, pastes or as a composite made by forming a coating of the negative electrode material on a conductive current collector or other suitable support.

Representative cathode (positive electrode) materials for secondary batteries include composites comprising a polymer binder (PB), a powdery electrode material and, optionally, an electroconductivity-imparting additive and/or a viscosity modifying agent.

The active material for the positive electrode preferably comprises a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

As an alternative, in the case of forming a positive electrode for a lithium-ion secondary battery, the active material may comprise a lithiated or partially lithiated transition metal oxyanion-based electro-active material of formula $M1M2(JO4)_fE_{1-f}$, wherein M1 is lithium, which may be partially substituted by another alkali metal representing less than 20% of the M1 metals, M2 is a transition metal at the oxidation level of +2 selected from Fe, Mn, Ni or mixtures thereof, which may be partially substituted by one or more additional metals at oxidation levels between +1 and +5 and representing less than 35% of the M2 metals, including 0, JO4 is any oxyanion wherein J is either P, S, V, Si, Nb, Mo or a combination thereof, E is a fluoride, hydroxide or chloride anion, f is the molar fraction of the JO4 oxyanion, generally comprised between 0.75 and 1.

The $M1M2(JO4)_fE_{1-f}$ electro-active material as defined above is preferably phosphate-based and may have an ordered or modified olivine structure.

More preferably, the active material is a phosphate-based electro-active material of formula $Li(Fe_xMn_{1-x})PO_4$ wherein 0≤x≤1, wherein x is preferably 1 (i.e. lithium iron phosphate of formula $LiFePO_4$).

When an active material showing a limited electron-conductivity, such as $LiCoO_2$ or $LiFePO_4$, is used, the positive electrode preferably also contains an electroconductivity-imparting additive, in order to improve the conductivity of a resultant composite electrode. Examples of said electroconductivity-imparting additive may include: carbonaceous materials, such as carbon black, graphite fine powder and fiber, and fine powder and fiber of metals, such as nickel and aluminum.

As per the polymer binder (PB), polymers well known in the art can be used including, preferably, vinylidene fluoride (VDF) polymers and even more particularly, VDF polymers comprising recurring units derived from VDF and from 0.01 to 5% moles of recurring units derived from at least one (meth)acrylic monomer [monomer (MA)] of formula:

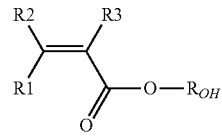

wherein each of R1, R2, R3, equal or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

For electric double layer capacitors, the active substance preferably comprises fine particles or fibre, such as activated carbon, activated carbon fibre, carbon nanotubes, graphene, silica or alumina particles, having an average particle (or fibre) diameter of 0.05-100 μm and a specific surface area of 100-3000 $m^2/g$, i.e., having a relatively small particle (or fibre) diameter and a relatively large specific surface area compared with those of active substances for batteries.

The separator for an electrochemical cell of the present invention can advantageously be an electrically insulating composite separator suitable for use in an electrochemical cell.

Typically, the separator comprises one substrate layer [layer S] that is coated/impregnated with composition C according to the present invention.

The term "substrate layer [layer S]" is hereby intended to denote either a monolayer substrate consisting of a single layer or a multilayer substrate comprising at least two layers adjacent to each other.

The layer S may be either a non-porous substrate layer or a porous substrate layer. Should the substrate layer be a multilayer substrate, the outer layer of said substrate may be either a non-porous substrate layer or a porous substrate layer.

By the term "porous substrate layer", it is hereby intended to denote a substrate layer containing pores of finite dimensions.

Layer S has typically a porosity advantageously of at least 5%, preferably of at least 10%, more preferably of at least 20% or at least 40% and advantageously of at most 90%, preferably of at most 80%, e.g. measured via methods based on the weight/density ratio or using liquid or gas absorption methods, e.g. according to the American Society for Testing and Materials (ASTM) D-2873 or equivalent methods known to the person skilled in the art.

The thickness of layer S is not particularly limited and is typically from 3 to 100 micrometers, preferably form 5 and 50 micrometers.

Layer S can be made by any porous substrate or fabric commonly used for a separator in electrochemical device, e.g. comprising at least one material selected from the group consisting of polyethyleneterephthalate, polybutyleneterephthalate, polyester, polyacetal, polyamide, polycarbonate, polyimide, polyetherether ketone, polyether sulfone, polyphenylene oxide, polyphenylene sulfide, polyethylene naphthalene, polyvinylidene fluoride, polyethylene oxide, polyacrylonitrile, polyethylene, polypropylene, fluorinated polymers such as PVDF and PTFE (polytetrafluoroethylene), or their mixtures. Preferably, layer S is made of polyethylene or polypropylene.

Advantageously, the assembly of the present invention is for use in an electrochemical device, which is preferably selected from batteries, including alkaline or alkaline-earth secondary batteries by Na, Li, Al, Ca, Mg, Zn, K, Y secondary batteries, lithium batteries being more preferred; electric double layer capacitors (also referred to as "supercapacitors"); and electro-chromic windows.

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

Experimental Section

Materials

The following were obtained from Sigma-Aldrich:
ethylenecarbonate (EC)
dimethylcarbonate (DMC)
lithium bis(trifluoromethan)sulfonimide (LiTFSI)
lithium hexafluorophosphate (LiPF6)

The following were obtained from Solvay Specialty Polymers Italy S.p.A.: Fluorolink® ZDOL (average number molecular weight Mn=1000)–non alkoxylated PFPE polymer Fluorolink® E10-H (average number molecular weight Mn=1700)–PFPE polymer having a degree of ethoxylation lower than 2

Solef® 5130 PVDF

The following were prepared as described herein after:
P(I): poly(ethoxy)perfluoropolyether complying with formula:

$$H(OCH_2CH_2)_{j1}OCH_2CF_2O(CF_2CF_2O)_{a1}(CF_2O)_{a2}CF_2CH_2O(CH_2CH_2O)_{j1}H$$

wherein j1=7, the ratio a1/a2=1.2, the average number molecular weight (Mn)=2,200 and F=1.8 was manufactured according to the procedure disclosed in the aforementioned international patent application WO 2014/090649 and is representative of the PFPE disclosed in prior art document U.S. Pat. No. 7,098,173 (GENERAL MOTORS CORPORATION) cited above.

P(II): poly(ethoxy)perfluoropolyether complying with formula: $H(OCH_2CH_2)_{j1}OCH_2CF_2O(CF_2CF_2O)_{a1}(CF_2O)_{a2}CF_2CH_2O(CH_2CH_2O)_{j1}H$ wherein j1=5, the ratio a1/a2=1.2, the average number molecular weight (Mn)=2,000 and F=1.8, was manufactured according to the procedure disclosed in WO 2014/090649.

P(III): poly(ethoxy-propoxy)-perfluoropolyether polymer complying with formula:

$$H(OCH(CH_3)CH_2)_{j2}(OCH_2CH_2)_{j1}OCH_2CF_2O(CF_2CF_2O)_{a1}(CF_2O)_{a2}CF_2CH_2O(CH_2CH_2O)_{j1}(CH_2CH(CH_3)O)_{j2}H$$

wherein j1=8.5, j2=4.5, the ratio a1/a2=1.2, the average number molecular weight (Mn)=2,900 and F=1.8, was manufactured according to the procedure disclosed in WO 2014/090649 cited above.

Test of Inflammability and Combustibility

Inflammability and combustibility properties of polymer P(I) and polymer P(II) were tested at Innovhub (IT).

Flammability test was performed by evaluating the flash point of the polymers according to UNI EN ISO 3680-2005. The flash point of a volatile material is the lowest temperature at which vapours of the material will ignite, given an ignition source. The flash point value is typically used to distinguish flammable liquids (such as petrol) from combustible liquids. Both polymer P(I) and polymer P(II) were found to be non-flammable.

Combustibility test was performed according to ASTM D4206-96 and the sustained combustibility test was performed according to paragraph 32.5.2 of Manual of tests and criteria of ADR p.348, United Nations (5$^{th}$ revised edition, 2009).

Both polymer P(I) and polymer P(II) were found to do not sustain combustibility.

EXAMPLE 1

Evaluation of Miscibility With LP30

Liquid formulations were prepared by mixing under stirring at room temperature P(I) or P(II) with standard LP30 electrolyte (LiPF6 1M in EC/DMC 1/1 by weight) in the ratio:

formulation A: P(I)/LP30=¼ by weight
formulation B: P(II)/LP30=¼ by weight

Comparative formulations were prepared following the same procedure:

formulation C1(*): Fluorolink® ZDOL/LP 30=¼ by weight and
formulation C2(*): Fluorolink® E10-H/LP 30=⅕ by weight.

The physical aspect of each formulation was evaluated by visual inspection. The results are reported in the following Table 1.

The ionic conductivity values for each formulation prepared as described above were measured at 25° C. in a sealed steel conductivity cell through electrochemical impedance spectroscopy (EIS) covering a frequency range from 200 mHz to 200 kHz with a perturbation amplitude of ±5mV. The average values measured on three single cells for each temperature are reported in Table 1.

The ionic conductivity of standard LP electrolyte was also measured for comparison.

TABLE 1

| Formulation | Aspect | Conductivity at 25° C. (mS/cm) |
| --- | --- | --- |
| A | Clear - 1 phase | 6.8 |
| B | Clear - 1 phase | 5.6 |

TABLE 1-continued

| Formulation | Aspect | Conductivity at 25° C. (mS/cm) |
|---|---|---|
| C1(*) | 2 phases | n/p |
| C2(*) | 2 phases | n/p |
| LP30(*) | Clear - 1 phase | 11 |

(*) comparison
n/p = evaluation not performed

Both Fluorolink® ZDOL (added in comparative composition C1) and
Fluorolink® E-10H (added in comparative composition C2) resulted not miscible with LP30, also at a concentration of 5% by weight.

The above results also showed that the formulations A and B according to the present invention have a conductivity in the same magnitude of standard LP30.

EXAMPLE 2

Evaluation of Miscibility With LiTFSI

Liquid formulations were prepared by dissolving at room temperature and under stirring LiTFSI in pure PFPE polymer:
formulation D: LiTFSI 20% (w/w) (1,1 M) in P(I)
formulation E: LiTFSI 20% (w/w) (1,1 M) in P(II)
Comparative formulations were prepared following the same procedure:
formulation F(*): LiTFSI 20% (w/w) (1,1 M) in Fluorolink® ZDOL
formulation G(*): LiTFSI 20% (w/w) (0,9 M) in EC/DMC 1/1 by weight The physical aspect of each formulation was evaluated by visual inspection. The results are reported in the following Table 2.

The ionic conductivity values for each formulation prepared as described above were measured at 25° C. in a sealed steel conductivity cell through electrochemical impedance spectroscopy (EIS) covering a frequency range from 200 mHz to 200 kHz with a perturbation amplitude of ±5mV. The average values measured on three single cells for each temperature are reported in Table 2.

TABLE 2

| Formulation | Aspect |
|---|---|
| D | Clear - 1 phase |
| E | Clear - 1 phase |
| F(*) | 2 phases |
| G(*) | Clear - 1 phase | n/p = not performed

The above results show that no sediments or phase separation was observed in the formulations according to the present invention.

EXAMPLE 3

Evaluation of Conductivity of Mixtures With Ethylene Carbonate and LiTFSI

Electrolyte formulations were prepared by mixing under stirring at room temperature LiTFSI 20% by weight in mixtures prepared using ethylene carbonate (EC) and one of P(I), P(II) and P(III) in ratio by weight of 1/1, 3/1 and 5/1.

The ionic conductivity values for each formulation prepared as described above were measured at 25° C. and at 55° C. in a sealed steel conductivity cell through electrochemical impedance spectroscopy (EIS) covering a frequency range from 200 mHz to 200 kHz with a perturbation amplitude of ±5mV. The average values measured on three single cells for each temperature are reported in Table 3.

TABLE 3

| | | Conductivity (mS/cm) | | |
|---|---|---|---|---|
| Polymer | Temperature (° C.) | LiTFSI 20% (w/w) in polymer/EC 1/1 (w/w) | LiTFSI 20% (w/w) in polymer/EC 1/3 (w/w) | LiTFSI 20% (w/w) in polymer/EC 1/5 (w/w) |
| P(I) | 25 | 2.7 | 3.3 | 4.4 |
| | 55 | 4.9 | 6.5 | 9.2 |
| P(II) | 25 | 2.1 | 3.5 | 4.6 |
| | 55 | 4.8 | 8.2 | 8.9 |
| P(III) | 25 | 1.1 | 1.0 | 3.7 |
| | 55 | 3.1 | 2.5 | 8.8 |

The conductivity values were found to be acceptable and within the same order of magnitude when compared to standard LP30 electrolyte, while providing the advantage of being non-flammable.

EXAMPLE 4

Evaluation of the Li Transport Number

With the aim to evaluate the Li+ transference numbers, potentiostatic polarization (PP) experiment was performed. The electrolyte plays an important role in governing the performance of Lithium ion batteries and electrolytes with Li+ transference number approaching unity, i.e. 1 are desirable for avoiding concentration gradient during the charge and discharge cycles.

The electrolyte was placed between two reversible Li electrodes (Li—Li symmetric cell). The initial current carried by all ions and the stationary current carried exclusively by the Li+ ions were measured. Polarization used was 10 mV.

The transference number current Li+ was defined by the ratio of the two currents.

The lithium transport number was evaluated at 25° C. for the following formulations:
formulation L: LiTFSI 20% (w/w) in P(II)/EC 1/1 (w/w)
formulation M: LiTFSI 20% (w/w) in PM/EC 1/1 (w/w)
and for standard electrolyte LP30 as comparison. The results are reported in the following Table 4.

TABLE 4

| Formulation | Li transport number (Iss/Io) |
|---|---|
| L | 0.64 |
| M | 0.61 |
| LP30(*) | 0.55 |

(*) comparison

The above data show a higher lithium ion mobility in the formulations according to the present invention, when compared to standard LP30 electrolyte.

EXAMPLE 5

Test at Low Temperature

Electrolyte formulations were prepared by mixing under stirring at room temperature LiTFSI 1M with the following components:

formulation N(*) as comparison: LiTFSI 1M with pure ethylene carbonate (EC)

formulation O: LiTFSI 1M with pure P(II)

formulation P: LiTFSI 1M with a mixture P(II)/EC in a ratio 1/1 by weight formulation Q: LiTFSI 1M with a mixture P(II)/EC in a ratio 1/5 by weight All the electrolyte formulations were liquid at 23° C. and were stored at 4° C. overnight.

The physical aspect of each formulation was evaluated by visual inspection:

formulations O, P and Q according to the present invention were clear and only one single phase was visible;

comparative formulation N(*) was frozen.

EXAMPLE 6

Test in a Battery With LiFePO$_4$

The following formulations :

LiTFSI 20% (w/w) in P(II)/EC 1/1 (w/w) [formulation R]
and
LiTFSI 20% (w/w) in P(II)/EC 1/5 (w/w) [formulation S]
prepared as disclosed above in Example 3 were tested in a Li/LiFePO$_4$ battery.

A LiFePO$_4$ electrode (thickness 50 microns, 0.51 mAh/cm$^2$) was prepared by mixing 82% LiFePO$_4$, 10% conductive carbon and 8% Solef® 5130 PVDF as binder. Circular electrodes (diameter 12 mm) were cut and tested in coin cells using lithium metal as counter electrode, without addition of liquid electrolyte. A test protocol was applied increasing progressively C-rate from C/20 to C/2, at T=55° C. Cut offs were 4.0-2.5 V vs. Li.

The results are reported for the two liquid electrolyte formulations in the following Table 5.

TABLE 5

| Cycle No. | Discharge C-rate | Specific discharge capacity (mAh/g) | |
|---|---|---|---|
| | | Formulation R | Formulation S |
| 2 | C/20 | 168 | 156 |
| 4 | C/10 | 155 | 151 |
| 7 | C/5 | 148 | 146 |
| 12 | C/2 | 139 | 141 |
| 17 | C | 135 | 139 |
| 22 | 2C | 131 | 134 |
| 27 | 5C | 98 | 119 |

C-rate is a measure of the rate at which a battery is discharged relative to its maximum capacity. For example, "C/20" rate means that the discharge current will discharge the entire battery in 20 hours.

Specific discharge capacity is the ratio between the capacity output of a battery and the weight of LiFePO$_4$ in the assembled electrode, at a certain discharge current (specified as C-rate) from 100 percent state-of-charge to the lower cut-off voltage.

The coulombic efficiency is the ratio of the output of charge by battery (discharge step) to the input of charge (charge step).

The above results showed good performances of the batteries prepared with the electrolyte formulation according to the present invention.

The invention claimed is:

1. A liquid composition C comprising:
   (a) at least one (per)fluoropolyether polymer P comprising at least one (per)fluoropolyoxyalkylene chain ($R_{pf}$) having two chain ends, wherein at least one chain end comprises a chain ($R_a$) complying with one of the following formulae ($R_{a-I}$) to ($R_{a-III}$):

   —(CH$_2$CH$_2$O)$_{j1}$—H  (Ra-I)

   —[CH$_2$CH(CH$_3$)O]$_{j2}$—H  (Ra-II)

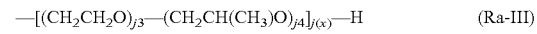
   —[(CH$_2$CH$_2$O)$_{j3}$—(CH$_2$CH(CH$_3$)O)$_{j4}$]$_{j(x)}$—H  (Ra-III)

wherein
   j1 and j2, each independently, are an integer from 4 to 10;
   j3, j4, and j(x) are integers from 1 to 25, and the sum of j3 and j4 is from 2 to 50;
   (b) at least one lithium salt;
   (c) optionally at least one non-aqueous solvent; selected from a group consisting of fluorinated aliphatic and cyclic carbonates, aliphatic and cyclic ethers, glymes, ionic liquids and mixtures thereof; and
   (d) optionally at least one further ingredient, selected from a group consisting of solvents comprising carboxylic esters, cyclic esters, cyclic sulfonates, alkyl sulfonates, alkyl phosphates, or mixtures thereof; vapour-pressure suppressing agents; overcharge-preventing agents; dehydrating agents; deoxidizing agents; solid electrolyte interface (SEI) forming agents; and mixtures thereof.

2. The liquid composition (C) according to claim 1, wherein said chain ($R_{pf}$) is a chain of formula

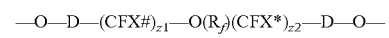
—O—D—(CFX#)$_{z1}$—O(R$_f$)(CFX*)$_{z2}$—D—O— wherein
z1 and z2, equal or different from each other, are equal to or higher than 1;
X# and X*, equal or different from each other, are —F or CF$_3$, provided that when z1 and/or z2 are higher than 1, X# and X* are —F;
D and D*, equal or different from each other, are an alkylene chain comprising from 1 to 6 carbon atoms, said alkyl chain being optionally substituted with at least one perfluoroalkyl group comprising from 1 to 3 carbon atoms;
(R$_f$) comprises repeating units R°, said repeating units being independently selected from the group consisting of:
(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CW$_2$O—, wherein each of W, equal or different from each other, are F, Cl, or H;
(iv) —CF$_2$CF$_2$CF$_2$CF$_2$O—;
(v) —(CF$_2$)—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being selected from: —CFXO—, —CF$_2$CFXO—, —CF$_2$CF$_2$CF$_2$O—, —CF$_2$CF$_2$CF$_2$CF$_2$O—, with each of each of X being independently F or CF$_3$, and T being a C$_1$-C$_3$ perfluoroalkyl group.

3. The liquid composition (C) according to claim 2, wherein said chain ($R_f$) is selected from chains of formula:

$$—[(CF_2CF_2O)_{a1}(CF_2O)_{a2}]— \qquad (R_f\text{-IIA})$$

wherein:
a1 and a2 are independently integers ≥0 such that the number average molecular weight is between 400 and 10,000;

$$—[(CF_2CF_2O)_{b1}(CF_2O)_{b2}(CF(CF_3)O)_{b3}(CF_2CF(CF_3)O)_{b4}]— \qquad (R_f\text{-IIB})$$

wherein:
b1, b2, b3, b4, are independently integers ≥0 such that the number average molecular weight is between 400 and 10,000;

$$—[(CF_2CF_2O)_{c1}(CF_2O)_{c2}(CF_2(CF_2)_{cw}CF_2O)_{c3}]— \qquad (R_f\text{-IIC})$$

wherein:
cw=1 or 2;
c1, c2, and c3 are independently integers ≥0 such that the number average molecular weight is between 400 and 10,000;

$$—[(CF_2CF(CF_3)O)_d]— \qquad (R_f\text{-IID})$$

wherein:
d is an integer>0 such that the number average molecular weight is between 400 and 10,000;

$$—[(CF_2CF_2C(Hal^*)_2O)_{e1}—(CF_2CF_2CH_2O)_{e2}—(CF_2CF_2CH(Hal^*)O)_{e3}] \qquad (R_f\text{-IIE})$$

wherein:
Hal*, equal or different at each occurrence, is a halogen selected from fluorine and chlorine atoms;
e1, e2, and e3, equal to or different from each other, are independently integers≥0 such that the (e1+e2+e3) sum is comprised between 2 and 300.

4. The liquid composition (C) according to claim 1, wherein said at least one polymer (P) is present in an amount of from 5 to 90 wt. %, based on the total weight of composition (C).

5. The liquid composition (C) according to claim 1, wherein said lithium salt is selected from the group consisting of: $LiPF_6$, $LiBF_4$, $LiClO_4$, lithium bis(oxalato)borate ("LiBOB"), $LiN(CF_3SO_2)_2$(LiTFSI), $LiN(C_2F_5SO_2)_2$, $M[N(CF_3SO_2)(R_FSO_2)]_n$ with RF being $C_2F_5$, $C_4F_9$, or $CF_3OCF_2CF_2$, $LiAsF_6$, $LiC(CF_3SO_2)_3$, 4,5-dicyano-2-(trifluoromethyl) imidazole (LiTDI), and combinations or mixtures thereof.

6. The liquid composition (C) according to claim 1, wherein said at least one lithium salt is present in a concentration higher than 0.5 moles/liter.

7. The liquid composition (C) according to claim 1, wherein said at least one solvent is selected from the group consisting of optionally fluorinated aliphatic and cyclic carbonates, aliphatic and cyclic ethers, glymes, ionic liquids, and mixtures thereof.

8. The liquid composition (C) according to claim 1, wherein said at least one solvent is in an amount of from 1 to 80 wt. % based on the total weight of said composition C.

9. The liquid composition (C) according to claim 1, wherein each of said further ingredients is present in an amount of from 0.01 to 5 wt. % based on the total weight of composition C.

10. An assembly comprising at least one anode, at least one cathode, a separator and a liquid electrolyte comprising composition (C) as defined in claim 1.

11. An electrochemical device comprising the assembly according to claim 10.

12. The electrochemical device according to claim 11, wherein said electrochemical device is selected from the group consisting of alkaline or alkaline-earth secondary batteries; Na, Li, Al, Ca, Mg, Zn, K, or Y secondary batteries; electric double layer capacitors; and electro-chromic windows.

13. The liquid composition (C) according to claim 2, wherein D and D*, equal or different from each other, are an alkylene chain comprising from 1 to 3 carbon atoms, said alkyl chain being optionally substituted with at least one perfluoroalkyl group comprising from 1 to 3 carbon atoms.

14. The liquid composition (C) according to claim 3, wherein
a1 and a2 are independently integers≥0 such that the number average molecular weight is between 400 and 5,000;
b1, b2, b3, b4, are independently integers≥0 such that the number average molecular weight is between 400 and 5,000;
c1, c2, and c3 are independently integers≥0 such that the number average molecular weight is between 400 and 5,000; and
d is an integer>0 such that the number average molecular weight is between 400 and 5,000.

15. The liquid composition (C) according to claim 3, wherein
a1 and a2 are different from zero, with the ratio a1/a2 being comprised between 0.1 and 10;
b1 is 0 and b2, b3 and b4 are >0, with the ratio b4/(b2+b3) being ≥1;
c1, c2 and c3 are all >0, with the ratio c3/(c1+c2) being less than 0.2.

16. The liquid composition (C) according to claim 4, wherein said at least one polymer (P) is present in an amount of from 10 to 85 wt. %, based on the total weight of composition (C).

17. The liquid composition (C) according to claim 6, wherein said at least one lithium salt is present in a concentration from 0.5 to 2 moles/liter.

* * * * *

UNITED STATES PATENT AND TRADEMARK OFFICE
CERTIFICATE OF CORRECTION

PATENT NO. : 11,329,317 B2
APPLICATION NO. : 16/320845
DATED : May 10, 2022
INVENTOR(S) : Silvia Rita Petricci et al.

It is certified that error appears in the above-identified patent and that said Letters Patent is hereby corrected as shown below:

In the Claims

In Claim 2, Column 14, Line 36, the formula:
"—O—D—(CFX#)$_{z1}$—O(R$_f$)(CFX*)$_{z2}$—D—O—"
Should read:
-- -O-D-(CFX$^{\#}$)$_{z1}$-O(R$_f$)(CFX*)$_{z2}$-D$^{*}$-O- --.

In Claim 5, Column 15, Line 44:
"RF"
Should read:
-- R$_F$ --.

Signed and Sealed this
Twenty-seventh Day of September, 2022

Katherine Kelly Vidal
*Director of the United States Patent and Trademark Office*